F. D. VOORHEES.
HOSE.
APPLICATION FILED MAY 11, 1911.
1,052,106.
Patented Feb. 4, 1913.
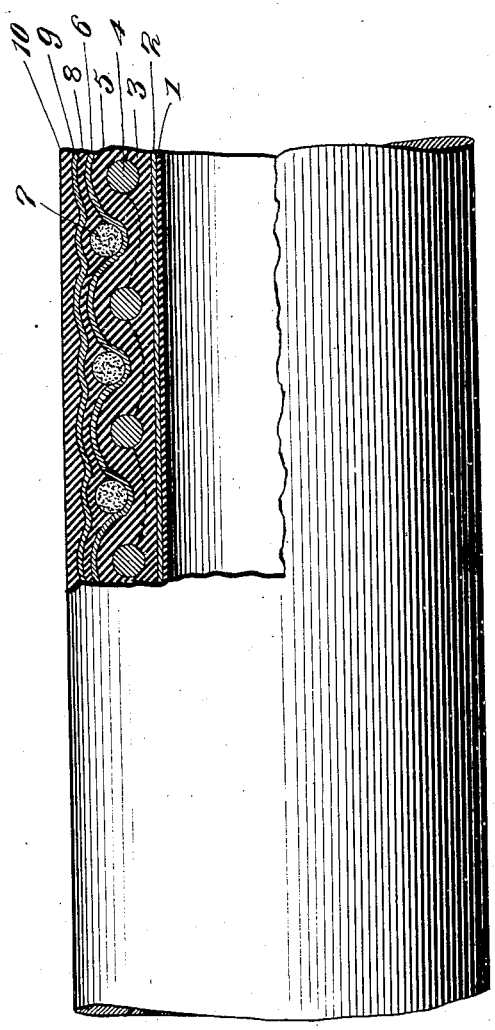
Witnesses:
Inventor
Frank D. Voorhees
By his Attorney

UNITED STATES PATENT OFFICE.

FRANK D. VOORHEES, OF MONTCLAIR, NEW JERSEY.

HOSE.

1,052,106.  Specification of Letters Patent.  Patented Feb. 4, 1913.

Application filed May 11, 1911. Serial No. 626,435.

*To all whom it may concern:*

Be it known that I, FRANK D. VOORHEES, a citizen of the United States, residing in the town of Montclair, county of Essex, and State of New Jersey, have invented certain new and useful Improvements in Hose, of which the following is a full, clear, and exact specification.

This invention relates to hose, and particularly to hose for use in suction and vacuum apparatus.

The improvement is particularly directed to an improved method of manufacturing hose and to a structure which will be self sustaining against internal vacuum or suction.

In the drawing accompanying and forming a part of this specification a section of hose embodying one practicable carrying out of my invention is illustrated, the section of hose being shown in elevation and partly in longitudinal section.

The body portion of the hose is shown sustained by a helically disposed wire. The coalescence of the body portion and the complete adhesion of the strata of the structure are essential to its air-tightness and non-collapsibility.

In the form of hose herein illustrated there is shown a lining 1 of rubber, over which, or rather outside of which is a layer of fabric 2. The rubber 1, and fabric 2, together, or either of these singly, may be regarded as the lining of the hose. The body portion of the structure comprises a continuous, homogeneous mass, preferably of rubber in which there is embodied a supporting frame, in the present illustration a helically disposed wire.

The preferable mode of laying up the hose will be by applying a ply of rubber, the lining 1, to the mandrel. Outside of this will be applied the fabric 2. A ply of rubber, comprising the portion 3, will be laid over the fabric. The wire 4 will then be wound with sufficient force to partially embed itself within the rubber 3, then a ply of rubber 5 will be imposed upon the wire 4, fabric 6 will then be laid over the bonding or filling material composed of plies 3 and 5 and draw the sheets of which such plies are composed into more or less close relationship with the wire and with each other. Power or pressure will then be applied for mashing the sheets or plies 3 and 5 together and into close adhesion with the entire surface of the wire, and for causing the fabric 6 to adhere to the filler, in which the wire is invested, and to the lining of the hose irrespective of irregularities in the thickness of the filler. Power or pressure is preferably so applied in the form of a helically disposed yarn 7, wound over the fabric 6 and having its convolutions disposed between the convolutions of the wire. The yarn will force the filler, the rubber body portion in the present illustration, in a radial direction inwardly and also laterally for causing the rubber to surround and adhere to the wire and for causing the rubber of the entire body portion to become one united mass which it will do under the influences of the vulcanizing heat and pressure to which the structure will be subjected while being cured. The application of the wire will mash the rubber of ply 3, and cause portions of it to enter the interstices of the fabric 2. The application of the binder 7, will mash the rubber of plies 5 and 3 into the interstices of the fabrics 6 and 2 respectively. The rubber inwardly of the binder will in most instances be denser than the other portions of the rubber in the hose. The material of the bonding or filling rubber, together with the other parts of the structure, will be held in position during the curing of the structure, and after the curing the binder will assist in maintaining the parts in their proper relations. It will thus be seen that the binder 7 establishes an adhesive relation between the filler and the lining and also establishes an adhesive relation between the fabric-covering 6 and the lining, and after the establishment of such adhesive relation, assists in the maintenance thereof.

In many situations it is desirable to have the outside of the hose substantially cylindrical and covered with a sanitary, wear-resisting, impervious material. Rubber is a good material for such use. It is much easier to leave the yarn in its cavity than it is to remove it and fill the cavity with other materials. If it is desired to leave the yarn in position to thicken the structure, to withstand wear, and also to resist the leakage of air, a ply of rubber 8 may be imposed upon the convolutions of the yarn and upon the exposed portions of the fabric 6. An additional ply of fabric 9 may be imposed upon the rubber 8, in which case this rubber ply may be applied in the form of rubber cement, and a final ply of rubber 10 may be applied to this last mentioned fabric forming the coating of the structure.

The usual removable fabric wrapping will be applied to the built up structure prior to its vulcanization and the application of this fabric together with the pressure and heat employed in vulcanization will cause the various irregularities formed by the yarn to be eliminated or blended at the outer surface of the hose. This structure is cleanly in that it has no deep recesses or exposed fabric or yarn to collect impurities. Its regular or smooth surface will not mar furniture, floors or floor coverings and will itself be wear resisting. It will be seen that by effecting a complete adhesion of the body portion to the entire wire surface and by causing this body portion which embeds the wires to coalesce into one continuous mass, and the various strata to closely adhere one with the other, a structure will be provided which will resist the tendency existing in present forms of vacuum hose to break down in places by the lining portions cleaving from the supporting structure.

We have in this present structure a body portion supported by a rigid framework, that is, rigid so far as radial movement is concerned, and upon this is a protecting and reinforcing structure, the yarn, reinforcing the body portion and compensating for irregularities in the body portion and the frame work, and outside of this is material for holding the reinforcing yarn in position, and for covering it up so that it not only will be protected from wear but from contaminating influences.

Cotton yarn is a strong, light, and efficient material to employ in the structure, but other material may be used for being forced between the convolutions of the supporting frame.

Changes in details of manufacture and selection of materials may be made within the scope of the claims without departing from the spirit of the invention.

Having thus described my invention, what I claim and desire to secure by Letters Patent is:

1. The improvement in the art of manufacturing hose, which consists in placing a ply of rubber upon a mandrel, then placing a ply of fabric over the rubber, then placing a ply of rubber upon this fabric, then tightly winding upon such rubber a wire with widely spaced-apart convolutions, imposing a ply of rubber upon the wire and the exposed portions of the rubber ply upon which the wire is wound, then imposing a ply of fabric upon the last-applied rubber ply, tightly winding yarn and imposing the convolutions thereof upon such fabric between the convolutions of the wire and thereby mashing the rubber filling into intimate connection with the wire and then heat-treating the rubber for effecting coalescence of the plies investing the wire.

2. A vacuum hose comprising a lining, a helical wire disposed outwardly of the lining, a cover disposed outwardly of the wire, bonding material between the lining and cover, a helical binder upon the cover having its convolutions disposed between the convolutions of the wire.

3. A hose comprising a lining embodying a fabric, a frame, a filler investing the frame and mashed into adhesive relation with the fabric of the lining, and means for holding the filler in adhesive relation to the lining.

4. A vacuum hose comprising an impervious lining, a fabric cover, a framework between the cover and lining, filling material investing the framework and disposed between the fabric and lining and mashed into adhesive relation with the lining and cover, and a binder for maintaining adhesion between the parts of the structure.

5. A vacuum hose comprising a lining, a helically-disposed wire located outwardly of the lining, fabric located outwardly of the wire, bonding material between the lining and fabric, a helical binder on the fabric having its convolutions located between the convolutions of the wire.

6. A vacuum hose comprising a lining, a helically-disposed wire located outwardly of the lining, fabric located outwardly of the wire, bonding material between the lining and fabric, a helical binder on the fabric having its convolutions located between the convolutions of the wire, and an impervious cover over the binder and fabric.

7. A vacuum hose comprising a lining, a helically-disposed wire located outwardly of the lining, fabric located outwardly of the wire, bonding material between the lining and fabric, a helical binder on the fabric having its convolutions located between the convolutions of the wire, an impervious cover over the binder and fabric, and an impervious leveling body enveloping the binder and fabric.

8. A vacuum hose comprising a rubber lining, fabric over the lining, filling material over such fabric, a helically-disposed wire invested in the filler, fabric over the filler, a helically-disposed yarn over the last-mentioned fabric for binding the two said fabrics together and upon the filler.

9. A vacuum hose comprising a rubber lining, fabric over the lining, filling material over such fabric, a helically-disposed wire invested in the filler, fabric over the filler, a helically-disposed yarn over the last-mentioned fabric for binding the two said fabrics together and upon the filler, a coating of rubber for the second fabric and the yarn filling the spaces therebetween, a third fabric over such coating, and a rubber surfacing over said third fabric leveling the sinuosities thereof.

10. In a hose, the combination with a helically-wound wire frame, of rubber investing said frame, a fabric overlying said investing rubber, a binder helically wound over the said fabric between the convolutions of the wire frame, a second fabric, cement between said second and first-mentioned fabrics and the binder, and a rubber coating outside said second fabric.

11. In a hose, the combination with a rubber lining, a fabric backing for such rubber lining, filling material outwardly of said fabric, a helically-wound wire embedded in said filling, a fabric covering outwardly of said filling, a helically-wound binder upon said fabric and having its convolutions disposed between the convolutions of the wire, a layer of cement disposed upon said last-mentioned fabric and the binder, and a covering of rubber forming the outer surface of the hose.

12. In a hose, the combination with a rubber lining, a fabric backing for such rubber lining, filling material outwardly of said fabric, a helically-wound wire embedded in said filling, a fabric covering outwardly of said filling, a helically-wound binder upon said fabric and having its convolutions disposed between the convolutions of the wire, and a layer of rubber outwardly of said fabric and the binder.

13. In a hose, the combination with a helically disposed wire frame-work, of rubber investing said frame-work, fabric overlying said investing rubber, a helically-disposed binder upon said fabric, and a rubber coating disposed outwardly of said fabric and binder.

In witness whereof I have hereunto set my hand in the presence of two subscribing witnesses.

FRANK D. VOORHEES.

Witnesses:
CHAS. LYON RUSSELL,
ISADORE BERNSTEIN.